United States Patent Office 3,285,927
Patented Nov. 15, 1966

---

3,285,927
PREPARATION OF METHYL PYRIDINIUM-2-ALDOXIME CHLORIDE
Robert I. Ellin, Baltimore, Md., assignor to the United States of America as represented by the Secretary of the Army
No Drawing. Filed Mar. 2, 1965, Ser. No. 436,697
4 Claims. (Cl. 260—296)

The invention described herein may be manufactured and used by or for the Government of the United States of America for governmental purposes without the payment to me of any royalty thereon.

This invention relates to a new process for the preparation of the compound 1-methylpyridinium-2-aldoxime chloride hereinafter designated as 2–PAM–Cl (2-pyridinium aldoxime methylchloride).

Prior methods for the preparation of this compound is set forth in the patents to Bloch 3,123,613 and Ellin et al. 3,140,289.

Originally, 1-methylpyridinum - 2-aldoxime iodide (2–PAM–I) which is disclosed and claimed by Wilson et al. in Patent 2,816,113 was considered to be the best antidote against lethal alkylphosphate or phosphonate intoxication. However, further research as indicated that 2–PAM–Cl is therapeutically superior and has widely supplanted the above iodide salt.

As a result of my investigations, I have discovered a simple method for the preparation of 2–PAM–Cl from Wilson's 2–PAM–I which has important economic advantage over any previous method known to me. This advantage is that the by-product of my reaction, methyl iodide is a useful intermediate for the production of 2–PAM–I by the Wilson process. Thus, in addition to obtaining the final product in a high yield and purity, my process also produces a useful intermediate which can be recycled and used over and over again in accordance with sound chemical engineering principles.

In my process, the 2–PAM–I is heated in methanolic hydrochloride until the solution is substantially reduced in volume and an inert water miscible oxygenated organic solvent such as acetone or a mixture of ethanol and diethyl ether is added to the residue to cause precipitation of the desired 2–PAM–Cl.

The reaction is believed to follow the sequence:

2–PAM–I+HCl+CH₃OH—2–PAM–Cl+H₂O+CH₃I

It is thus apparent that the methyl iodide given off in my reaction can be reused to make fresh 2–PAM–I in the manner set forth by Wilson et al.

In my process, the methyl iodide is given off as a gas, substantially all the methanol boiled off, and water is formed in the reaction. The addition of one of the above oxygenated solvents causes the desired 2–PAM–Cl to precipitate. Methanol cannot be used as this solvent since 2–PAM–Cl is substantially soluble in it.

A modification of my process consists in the removal of the water of the reaction. This can be accomplished by simple dehydration by the use of water absorbers such as phosphorus pentoxide under a vacuum or by lyophilization of the concentrated reaction solution.

Example 1

To 2.65 grams (0.01 M) of 2–PAM iodide in a 150 ml. Erlenmeyer flask, 50 ml. of methanol containing 2.7 grams of dry hydrochloric acid was added. The flask is heated on a steam bath for 40 minutes and reduced to a volume of approximately 10 ml. Upon cooling a gel-like solid formed. Upon addition of 2 ml. of acetone, a finely divided white solid appeared. The solid was filtered, washed with ether and dried in a desiccator. 1.5 grams of bright crystals (88% yield) were obtained, having a melting point of 235–7° C.

*Analysis.*—Calculated: C, 48.7; H, 5.3; Cl, 20.6. Found: C, 48.8; H, 5.3; Cl, 20.6.

In the above example, I have obtained similar results using a 50% mixture of ethanol and diethyl ether. However, the use of acetone is preferred.

I have found that the range of reactants can vary from about 5 to 10 mols of hydrogen chloride per mol of PAM–I. The volume of the solvent used is not critical and can vary from 1 to 3 volumes of solvent for each 10 ml. of the concentrated reaction solution.

I claim:
1. A method which consists of
   (a) heating 1-methyl pyridinium 2-aldoxime iodide with hydrogen chloride and methanol wherein the molar ratio of 1-methyl pyridinium aldoxime iodide to hydrogen chloride is from 1:5 to 1:10 at a temperature of about 100° C. until the volume of the reactive mass is substantially reduced and the methyl iodide formed as a by-product is driven off as a gas,
   (b) dehydrating the residue to produce 1-methyl pyridinium 2-aldoxime chloride.
2. A method which consists of
   (a) heating 1-methyl pyridinium 2-aldoxime iodide with hydrogen chloride and methanol wherein the molar ratio of 1-methyl pyridinium aldoxime iodide to hydrogen chloride is from 1:5 to 1:10 at a temperature of about 100° C. until the volume of the reactive mass is substantially reduced and the methyl iodide formed as a by-product is driven off as a gas,
   (b) adding an inert water miscible oxygenated organic solvent selected from the group consisting of acetone and a mixture of ethanol and diethyl ether, to precipitate 1-methyl pyridinium 2-aldoxime chloride.
3. The method as set forth in claim 2 in which the solvent used is acetone.
4. The method as set forth in claim 2 in which the solvent used is a mixture of ethanol and diethyl ether.

References Cited by the Examiner
UNITED STATES PATENTS

| | | | |
|---|---|---|---|
| 2,816,113 | 12/1957 | Wilson | 260—296 |
| 2,823,987 | 2/1958 | Fielden et al. | 260—296 |
| 3,123,613 | 3/1964 | Bloch | 260—296 |

WALTER A. MODANCE, *Primary Examiner.*

H. I. MOATZ, *Assistant Examiner.*